June 29, 1954  V. L. BISHOP  2,682,421
PIVOTING LIMITING MEANS FOR HINGEDLY SECURED VEHICLES
Filed Feb. 18, 1952
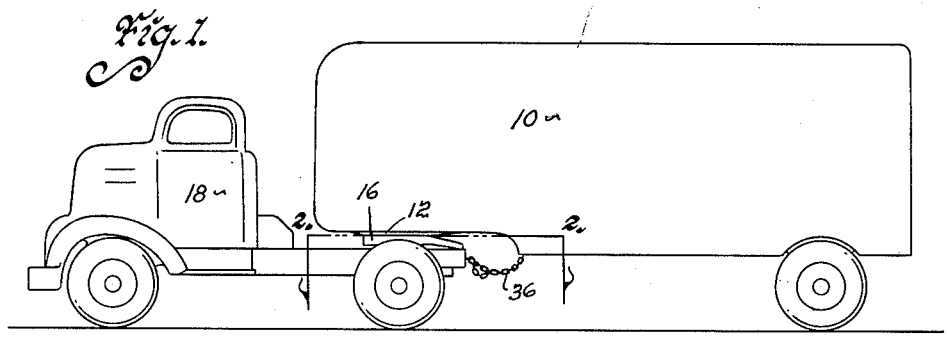
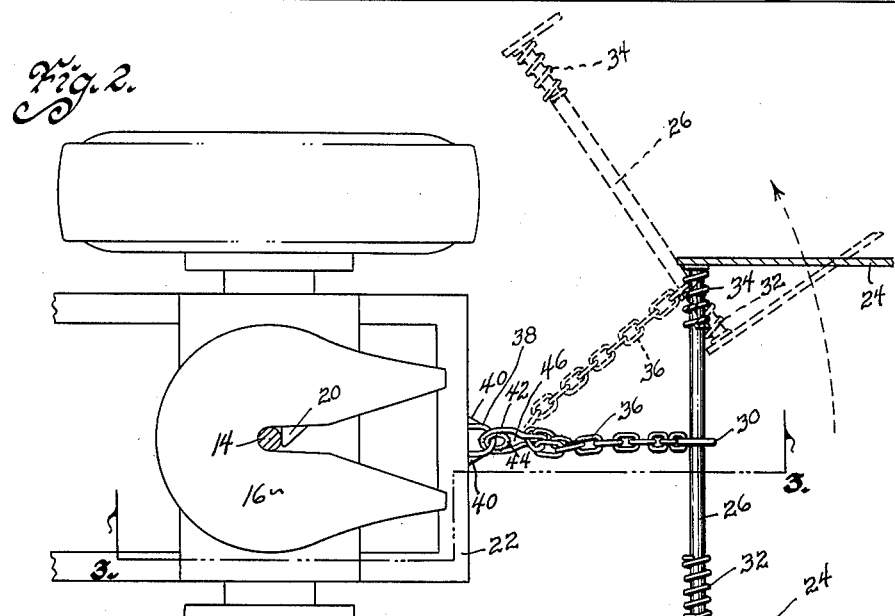
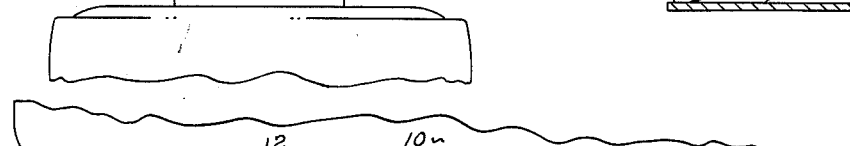
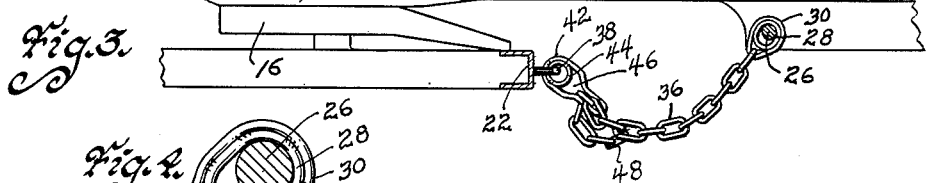
Inventor
Vernon L. Bishop
by Talbert Dick & Adler
Attorneys Patented June 29, 1954

2,682,421

UNITED STATES PATENT OFFICE 2,682,421

PIVOTING LIMITING MEANS FOR HINGEDLY SECURED VEHICLES

Vernon L. Bishop, Des Moines, Iowa

Application February 18, 1952, Serial No. 272,169

8 Claims. (Cl. 280—432)

My invention relates to the art of vehicles that are hingedly secured together. Specifically I have devised a single connector of variable effective length that is secured to at least one of the vehicles in a laterally movable manner so that this single connector may serve to limit pivoting movement in two directions. My invention also incorporates certain novel features as to coupling and adjustment, as well as serving as an auxiliary hitch.

The use of prime mover tractors and semi-trailers has developed into a tremendous transportation business. House trailers are also becoming increasingly popular as a dwelling for retired couples and transient workers or as vacation housing for many people. Both of these forms of vehicles have a towing prime mover coupled to a vehicle that is towed by the prime mover and hingedly secured thereto. Normally the towing vehicle is always exerting at least a slight pull on the semi-trailer or the like which keeps the operator in control of the longitudinal alignment of the two vehicles. Under some circumstances, however, the trailer tends to overtake the towing prime mover. This pushing of the prime mover is unsatisfactory, but usually not extremely hazardous. It can become a very serious problem, however, when the tractor and trailer are not longitudinally aligned. If the trailer is moving more rapidly than the tractor when some pivoting action has already occurred between the two, the trailer tends to cause extreme pivoting known as jack-knifing. All control over the forward direction of a semi-trailer vehicle is lost when jack-knifing occurs. Very serious accidents can and have resulted from this loss of control. The problem has been attacked by many different people in almost countless variation of a few major ideas and some excellent structures have been devised. In my opinion all of these structures have had serious drawbacks as I shall now show.

The devices that are known to me I shall group as follows: the variable length limiters; the trailer braking devices; the stop blocks; and the gear type. I shall now discuss each of these groups singly. The stop blocks are discussed first as being the most undesirable and requiring the least discussion. The stop blocks are, as the name implies, absolute barriers against the excessive turning of the two vehicles relative to each other. Because of their rigid character, they are secured near to the pivot point of attachment. A tremendous force is exerted on them, therefore, and hence they must be very strongly attached. This latter fact practically eliminates the possibility of making this form adjustable. Consequently they must be so placed as to permit a very sharp angle between the two vehicles for parking and docking. All these limitations practically eliminate the stop blocks as a safety factor except to prevent damage to the vehicle body as the result of a complete jack-knife. Obviously this class of device leaves much to be desired.

The trailer braking devices operate on the principle that a positive brake applied near the rear of the tractor will tend to straighten the tractor and trailer. This principle is sound, but the devices developed so far are extremely expensive and complex units. They are also damaging to road surfaces as they all incorporate some anchoring means being forced into contact with the road surface. Furthermore such devices cannot serve as an auxiliary safety hitch as some anti-jack-knifing devices can. Clearly this form of device for preventing jack-knifing is not a complete solution to the problem.

The gear device is very sound and an excellently operating unit. A large curved segment gear is mounted on one of the vehicles which engages a pinion mounted on the other. The pinion is secured to a brake drum and band assembly that is controlled by the operator. Obviously the operator can resist or stop entirely any relative turning motion of the two vehicles. Even such a mechanically fine device has draw-backs, however, not the least of which is the enormous cost involved in making and mounting such a unit. A device such as this one costs from five to six times as much as other devices that will substantially solve the problem. Also of course this unit does not serve as a safety hitch. Consequently this device still is not regarded by many people as being the answer.

The last group of devices in my listing are the variable length limiters. Such devices in essence are cables, chains or telescoping shafts that exert a limiting force between the more widely separated portions of a tractor trailer rig as it begins to execute an extreme turn. In general two connectors or limiters are used one at each side of the forward end of the trailer and connected to some point on the tractor. Frequently the chains or like are secured at the corresponding point on the tractor as they are on the trailer. In any event, this type of unit has been relatively expensive, because a considerable quantity of material is used. Also the adjustment and securing of these variable length limiters has not been entirely satisfactory. They have not been widely adopted, therefore, and there remains considerable room for improvement in the art.

As yet little or no effort has been made to provide the usual house trailer with an anti-jack-knifing device as far as I know. Many States require the use of safety chains to insure that the trailer and its towing vehicle do not become completely disconnected. These chains are usually crossed to permit free turning, however, and offer little or no resistance to jack-knifing.

In view of the foregoing it is the principal object of my invention to provide a pivoting limiting means for hingedly secured vehicles that uses less material in its construction.

It is a further object of my invention to provide a pivoting limiting means for hingedly secured vehicles that provides greater flexibility of operation of the vehicles without unnecessary restriction of their movement during normal turning.

It is a further object of my invention to provide a pivoting limiting means for hingedly secured vehicles that has an extremely simple, rapid and effective securing and adjusting structure.

It is a further object of my invention to provide a pivoting limiting means for hingedly secured vehicles that resists the extreme turning of prime mover and trailer with a gradually increasing resistance.

It is a further object of my invention to provide a pivoting limiting means for hingedly secured vehicles that may be used successfully on house trailers and the vehicles towing them.

It is a further object of my invention to provide a pivoting limiting means for hingedly secured vehicles that will serve as an auxiliary coupling for any pivotally secured vehicles that have a limited coupling surface.

It is a further object of my invention to provide a pivoting limiting means for hingedly secured vehicles that is economical to manufacture and install and is durable in use.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is a side elevation view of a tractor and semi-trailer equipped with my invention.

Fig. 2 is an enlarged fragmentary plan view of the coupling of the tractor and semi-trailer taken on the line 2—2 of Fig. 1.

Fig. 3 is a side elevation view of the material shown in Fig. 2 and taken on the line 3—3 of Fig. 2.

Fig. 4 is an enlarged fragmentary side elevation view of the rear end of the chain of Figure 3.

Referring to the drawings I have used the numeral 10 to designate a semi-trailer that has a bearing plate 12 and a pin 14 which engage the "fifth wheel" 16 of the tractor 18. A coupling latch 20 holds pin 14 from being withdrawn accidentally. My invention is secured between the trailer 10 and the tractor 18 and preferably as shown in Figs. 2 and 3 between the rear frame 22 of the tractor and the identical frame elements 24 of the trailer 10. On the trailer I mount rigidly an elongated shaft 26 extending transversely of the trailer length. There is no particularly advantageous shape for this shaft but its outer surface particularly at the rear should be smooth. I have shown this shaft as round in cross-section as being a strong economical shape. An oval shaped slide ring 28 is movably mounted on shaft 26 as to be slideable thereon. A reinforcing attaching loop 30 is rigidly secured to ring 28. At each end of shaft 28 is a shock absorbing spring. They are separately designated 32 and 34 in Fig. 2. A flexible or telescoping connector is secured to attaching loop 30, and I have found that a chain such as the one designated 36 is highly satisfactory. On the tractor I mount rigidly a coupling loop 38 that is strongly braced at its sides by gussets 40. These parts are rigidly secured in some satisfactory manner such as welding or the like. A coupling key 42 is rigidly secured to circle ring 44. The latter is merely called the circle ring to distinguish from the oval ring 28 and could well be made in a variety of shapes without changing my invention. The coupling key has an enlarged opening 46 at its forward end and an elongated slot portion at its rear end. The opening and the slot are in communication with each other and the slot is only slightly wider than the thickness of the chain links. Consequently the chain end may be dropped through the opening until a suitable adustment is made and then the proper link to give the right adjustment is drawn back into the slot and the chain end is secure in the coupling key. A "safety-pin" 48 is used to secure the excess chain up out of the way. It is not essential to the operation of the device of course. This securing and adjustment means is very simple and has no tightly fitting pins or the like. It is possible to break ice and snow off the coupling without fear of damaging it. Also the strains exerted by the normal use of the chain will not cause the coupling means to bind and get jammed. While I have shown only a bar mounted on the trailer, I am well aware that in some cases it may be well to have bars on both vehicles, each of which is engaged by a sliding element.

The operation of my invention is perhaps self-evident, but certain advantages that result from it are not. By using the sliding bar, I am free to use a single limiting chain for both directions of turn. Also because of the sliding bar my chain 36 may be drawn shorter for normal operation than is true of many of the variable effective length limiters. My chain serves as an excellent auxiliary coupling on large semi-trailer trucks because considerable movement is necessary before the bearing plate 12 and the "fifth wheel" become entirely disassociated. Because of this close coupling also my device will serve as an emergency chain and anti-jack-knifing device for house trailers that have only a ball and socket coupling as distinguished from the broad flat "fifth wheel" shown in the drawings. This same fact would be true in regard to any limited coupling surface trailer tractor hitch. The springs 32 and 34 will absorb the shock and gradually increase resistance to movement of loop 28 as the chain becomes taut during turns. I also am confident that my device can be manufactured and marketed for less than those presently on the market and that it will require little or no maintenance is self-evident.

Some changes may be made in the construction and arrangement of my pivoting limiting means for hingedly secured vehicles without departing from the real spirit and purpose of my invention, and it is my intention to cover by my claims, any modified forms of structure or use of mechanical equivalents which may be reasonably included within their scope.

I claim:

1. In an emergency hitch and pivot limiting device for pivotally secured vehicles, an elongated laterally straight shaft secured to at least one of said vehicles, a sliding element mounted on said elongated laterally straight shaft, a coupling on the other of said vehicles, said laterally straight shaft and said coupling being a spaced apart distance from each other and from the point where said vehicles are pivotally secured and a limiting means of variable effective length secured between said sliding element and said coupling.

2. In an emergency hitch and pivot limiting device for pivotally secured vehicles, an elongated laterally straight shaft secured to one of two pivotally secured vehicles, an elongated ring sliding element engaging said elongated laterally straight shaft, a coupling on the other of two pivotally secured vehicles said laterally straight shaft and said coupling being a spaced apart distance from each other and from the point where said vehicles are pivotally secured and a variable effective length connection secured between said elongated ring sliding element and said coupling.

3. In an emergency hitch and pivot limiting device for pivotally secured vehicles, an elongated laterally straight shaft secured to at least one of said vehicles, a pair of springs one embracing said elongated laterally straight shaft at each end, a sliding element mounted on said elongated laterally straight shaft, a coupling on the other of said vehicles, said laterally straight shaft and said coupling being a spaced apart distance from each other and from the point where said vehicles are pivotally secured and a limiting means of variable effective length secured between said sliding element and said coupling.

4. In an emergency hitch and pivot limiting device for pivotally secured vehicles, an elongated laterally straight shaft secured to one of two pivotally secured vehicles, a pair of springs one embracing said elongated laterally straight shaft at each end, an elongated ring sliding element engaging said elongated laterally straight shaft, a coupling on the other of two pivotally secured vehicles, said laterally straight shaft and said coupling being a spaced apart distance from each other and from the point where said vehicles are pivotally secured and a variable effective length connection secured between said elongated ring sliding element and said coupling.

5. In an emergency hitch and pivot limiting device for pivotally secured vehicles, an elongated laterally straight shaft secured to at least one of said vehicles, a pair of springs one embracing said elongated laterally straight shaft at each end, a sliding element mounted on said elongated shaft, a coupling key having a large loop opening thereon communicating with an elongated narrow slot secured to the other of two pivotally secured vehicles, said laterally straight shaft and said coupling key being a spaced apart distance from each other and from the point where said vehicles are pivotally secured, a chain secured between said sliding element and said coupling key; said chain having links of a thickness that will just enter said slot and said chain secured to said coupling key by being inserted through said opening and one of the links being drawn into the slot edgewise.

6. In an emergency hitch and pivot limiting device for pivotally secured vehicles, an elongated laterally straight shaft secured to one of two pivotally secured vehicles, an elongated ring sliding element engaging said elongated laterally straight shaft, a coupling key having a large loop opening thereon communicating with an elongated narrow slot secured to the other of two pivotally secured vehicles, said laterally straight shaft and said coupling key being a spaced apart distance from each other and from the point where said vehicles are pivotally secured, a chain secured between said sliding element and said coupling key; said chain having links of a thickness that will just enter said slot and said chain secured to said coupling key by being inserted through said opening and one of the links being drawn into the slot edgewise.

7. In an emergency hitch and pivot limiting device for pivotally secured vehicles, an elongated laterally straight shaft secured to one of two pivotally secured vehicles, a pair of springs one embracing said elongated laterally straight shaft at each end, an elongated ring sliding element engaging said elongated shaft, a coupling key having a large loop opening thereon communicating with an elongated narrow slot secured to the other of two pivotally secured vehicles, said laterally straight shaft and said coupling key being a spaced apart distance from each other and from the point where said vehicles are pivotally secured, a chain secured between said sliding element and said coupling key; said chain having links of a thickness that will just enter said slot and said chain secured to said coupling key by being inserted through said opening and one of the links being drawn into the slot edgewise.

8. In an emergency hitch and pivot limiting device for pivotally secured vehicles, an elongated shaft secured to at least one of said vehicles, a sliding element mounted on said elongated shaft, a coupling on the other of said vehicles, said laterally straight shaft and said coupling being a spaced apart distance from each other and from the point where said vehicles are pivotally secured, and a limiting means of variable effective length secured between said sliding element and said coupling; said shaft being straighter than the curve of the arc formed by any point on one of said pivotally secured vehicles with reference to the pivot point between said vehicles during pivotal movement between said vehicles.

References Cited in the file of this patent

UNITED STATES PATENTS

| Number | Name | Date |
|---|---|---|
| 1,211,825 | Curl | Jan. 9, 1917 |
| 1,445,754 | Casey | Feb. 20, 1923 |
| 2,259,923 | Byrne et al. | Oct. 21, 1941 |
| 2,435,813 | Williams | Feb. 10, 1948 |